United States Patent
Sindhwani et al.

(10) Patent No.: US 11,697,205 B2
(45) Date of Patent: Jul. 11, 2023

(54) DETERMINING CONTROL POLICIES FOR ROBOTS WITH NOISE-TOLERANT STRUCTURED EXPLORATION

(71) Applicant: GOOGLE LLC, Mountain View, CA (US)

(72) Inventors: Vikas Sindhwani, Hastings-on-Hudson, NY (US); Atil Iscen, Brooklyn, NY (US); Krzysztof Marcin Choromanski, New York, NY (US)

(73) Assignee: Google LLC, Mountain View, CA (US)

(*) Notice: Subject to any disclaimer, the term of this patent is extended or adjusted under 35 U.S.C. 154(b) by 572 days.

(21) Appl. No.: 16/649,598

(22) PCT Filed: Sep. 21, 2018

(86) PCT No.: PCT/US2018/052226
§ 371 (c)(1),
(2) Date: Mar. 20, 2020

(87) PCT Pub. No.: WO2019/060730
PCT Pub. Date: Mar. 28, 2019

(65) Prior Publication Data
US 2020/0276704 A1     Sep. 3, 2020

Related U.S. Application Data (60) Provisional application No. 62/599,552, filed on Dec. 15, 2017, provisional application No. 62/562,286, filed on Sep. 22, 2017.

(51) Int. Cl.
*G06N 3/08* (2023.01)
*B25J 9/16* (2006.01)
*G06N 20/00* (2019.01)

(52) U.S. Cl.
CPC ............. *B25J 9/163* (2013.01); *B25J 9/1661* (2013.01); *B25J 9/1671* (2013.01); *G06N 3/08* (2013.01); *G06N 20/00* (2019.01)

(58) Field of Classification Search
CPC ................................ G06N 3/08; G06N 20/00
See application file for complete search history.

(56) References Cited

FOREIGN PATENT DOCUMENTS

| | | | |
|---|---|---|---|
| CN | 103240739 A | 8/2013 | |
| CN | 105252180 A | 1/2016 | |
| CN | 106625610 A | 5/2017 | |
| CN | 106737673 A | 5/2017 | |
| CN | 106886155 A | 6/2017 | |
| CN | 107020636 A | 8/2017 | |

OTHER PUBLICATIONS

Office Action in Chinese Appln. No. 201880038417.3, dated May 16, 2022, 12 pages (with English Translation).
Amaran et al., "Simulation optimization: a review of algorithms and applications", Annals of Operations Research, 2016, 240(1):351-380.

(Continued)

*Primary Examiner* — Hau H Hoang
(74) *Attorney, Agent, or Firm* — Fish & Richardson P.C.

(57) ABSTRACT

Methods, systems, and apparatus, including computer programs encoded on computer storage media, for optimizing the determination of control policies for robots through the performance of simulations of robots and real-world context to determine control policy parameters.

20 Claims, 4 Drawing Sheets

(56) References Cited

OTHER PUBLICATIONS

Bojarski et al., "Structured adaptive and random spinners for fast machine learning computations", arXiv:1610.06209v3, Nov. 2016, 18 pages.
Byrd et al., "A limited memory algorithm for bound constrained optimization", SIAM Journal on Scientific Computing, 1995, 16(5):1190-1208.
Choromanski et al., "The unreasonable effectiveness of structured random orthogonal embeddings", Advances in Neural Information Processing Systems, 2017, pp. 219-228.
Conn et al., "Introduction to derivative free optimization", vol. 8, Siam, 2009, 3 pages.
Deisemoth et al., "A survey on policy search for robotics", Foundations and Trends in Robotics, 2013, 2.1(2):1-142.
Geng et al., "Fast biped walking with a reflexive controller and reaim time policy searching, Advances in Neural Information Processing Systems", 2006, pp. 427-434.
GhostRobotics.io [online], "Robots that Feel the World", published on or before Mar. 20, 2020, retrieved on Apr. 23, 2020, retrieved from URL<https://www.ghostrobotics.io/minitaur>, 1 page.
Golub et al., "Matrix Computations", vol. 3, JHU Press, 2012, 9 pages.
International Preliminary Report on Patentability in International Application No. PCT/US2018/052226, dated Mar. 24, 2020, 8 pages.
International Search Report and Written Opinion in International Application No. PCT/US2018/052226, dated Feb. 13, 2019, 14 pages.
Kohl et al., "Policy gradient reinforcement learning for fast quadrupedal locomotion", IEEE International Conference on Robotics and Automotion, 2004, 3:2619-2624.
Li et al., "Iterative linear quadratic regulator design for nonlinear biological movement Systems", ICINCO, 2014, 1:222-229.
MuJoCo.org [online], "Advanced Physics Simulation", published on or before Mar. 20, 2020, retrieved on Apr. 23, 2020, retrieved from URL<http://www.mujoco.org.>, 1 page.
Nesterov et al., "Random gradient free minimization of convex functions", Foundations of Computational Mathematics, 2017, 17(2):527-566.
Ng et al., "Autonomous inverted helicopter flight via reinforcement learning", Experimental Robotics IX, Springer, 2006, pp. 363-372.
Peters et al., "Policy gradient methods for robotics", International Conference on Intelligent Robots and Systems, 2006, pp. 2219-2225.
pybullet.org [online], "Bullet real-time physics simulation", published on or before Mar. 20, 2020, retrieved on Apr. 23, 2020, retrieved from URL<http://www.bulletphysics.org>, 8 pages.
Salimans et al., "Evolution strategies as a scalable alternative to reinforcement learning", arXiv:1703.03864v2, Sep. 2017, 13 pages.
Sindhwani et al., "Sequential operator splitting for constrained nonlinear optimal control", 2017 American Control Conference, pp. 4864-4871.
Tassa et al., "Control limited differential dynamic programming", IEEE International Conference on Robotics and Automation, 2014, pp. 1168-1175.
Wright et al., "Numerical Optimization", Springer Science and Business Media, 2006.
Zhu et al., "Algorithm 778: L-bfgs-b: Fortran subroutines for large scale bound constrained optimization", ACM Transactions on Mathematical Software, 1997, 23(4):550-560.

DETERMINING CONTROL POLICIES FOR ROBOTS WITH NOISE-TOLERANT STRUCTURED EXPLORATION

CROSS-REFERENCE TO RELATED APPLICATIONS

In the United States, this application claims the benefit under 35 U.S.C. § 119(e) of the filing date of U.S. Patent Application No. 62/562,286, which was filed on Sep. 22, 2017, and the filing date of U.S. Patent Application No. 62/599,552, which was filed on Dec. 15, 2017, both of which are incorporated here by reference.

BACKGROUND

This specification relates to technologies for optimizing the determination of control policy parameters for robot motor skills and control policies through the performance of simulations of robots and real-world context to determine control policy parameters.

SUMMARY

This specification describes technologies that efficiently determine control parameters for a physical or simulated robot or for an object in a physics simulation or rendering process.

One novel aspect of the subject matter of this specification is a system, method, or a program of computer instructions for determining a control policy for a robot. The method, for example, comprises receiving a specification in the form of an objective function $f$ of a task to be performed by a robot, wherein $f$ is a scalar-valued objective function of a control policy, and the control policy determines, for each state s of the robot, an action u to be performed by the robot, and wherein the objective function $f$ represents how well the robot performs the task; and determining the control policy for the robot to perform the task by simulating operation of the robot to determine the control policy x* by solving an optimization problem of the form $$x^* = \mathop{\mathrm{argmin}}_{x \in \mathbb{R}^n} f(x),$$

wherein $x \in \mathbb{R}^n$ is a state of the control policy encountered during the simulating of the operation of the robot, and wherein the solving the optimization problem comprises estimating gradients of the objective function $f$ using a finite difference procedure to estimate the gradients in perturbation directions defined by rows of a balanced spinner, balanced spinners being structured matrices that define a rotation or a linear transformation that is close to a rotation of a coordinate system of x.

Another novel aspect of the subject matter of this specification is a system, method, or a program of computer instructions for determining a control policy for a robot. The method, for example, comprises determining a control policy for a robot that has dynamics defined by a dynamics function $f$, wherein $x_{t+1} = f(x_t, u_t)$ is a state $x_{t+1}$ at time t+1 after the robot receives control input $u_t$ when the robot is in state $x_t$, the determining of the control policy comprising simulating operation of the robot to determine the control policy, including solving a trajectory optimization problem having a cost function that represents the task of the form $$\mathop{\mathrm{argmin}}_{u_0 \ldots u_{T-1}} \sum_{t=0}^{T-1} c_t(x_t, u_t) + c_T(x_T)$$

wherein time T is an optimization horizon, $c_t$ and $C_T$ are stage-wise and terminal cost functions, respectively, and the control policy comprises the sequence of actions $u_0 \ldots u_{T-1}$, and wherein the solving the trajectory optimization problem comprises linearizing $f$ locally using a finite difference procedure to estimate Jacobians of $f$ at times t, comprising estimating $f$ at times t in perturbation directions defined by rows of a balanced spinner, balanced spinners being structured matrices that define a rotation or a linear transformation that is close to a rotation of a coordinate system of $f$ at times t.

The subject matter described in this specification can be implemented in particular embodiments so as to realize one or more of the following advantages. The technologies can easily be plugged into mature optimization routines, including solvers for general purpose nonlinear programming that can handle complex constraints, that are difficult to explicitly incorporate in existing model-free reinforcement learning approaches. Using parameter perturbation directions defined by a family of structured orthogonal matrices, the structured finite differences described in this specification consistently gives high quality approximations of gradients and Jacobians in comparison to approaches that use coordinate directions or random Gaussian perturbations in estimating gradients by finite differences. Trajectory optimizers like Iterative LQR (linear-quadratic regulator) and Differential Dynamic Programming require fewer iterations to solve several classic continuous control tasks when the techniques described in this specification are used to linearize noisy, blackbox dynamics instead of standard finite differences. With structured exploration as described in this specification embedded in a quasi-Newton optimizer, Limited-memory Broyden-Fletcher-Goldfarb-Shanno (LBFGS), a simulation is able to learn agile walking and turning policies for quadruped locomotion that successfully transfer from simulation to actual hardware.

The use of structured orthogonal matrices to define parameter variation directions can result in an optimization processes exhibiting robustness to the noise that is typically present in many continuous control tasks. As a result, optimization processes using the structured orthogonal matrices, such as the balanced spinners described herein, can result in a faster convergence when compared with other finite difference approaches. This can result in a reduction in the time taken to optimize (and a reduction in the computational expense of optimizing) a control policy for a robot. This can, in turn, enable a wider range of potential designs to be virtually tested and examined for suitability before real world testing of said robot is performed.

DETAILED DESCRIPTION

Figure 1:
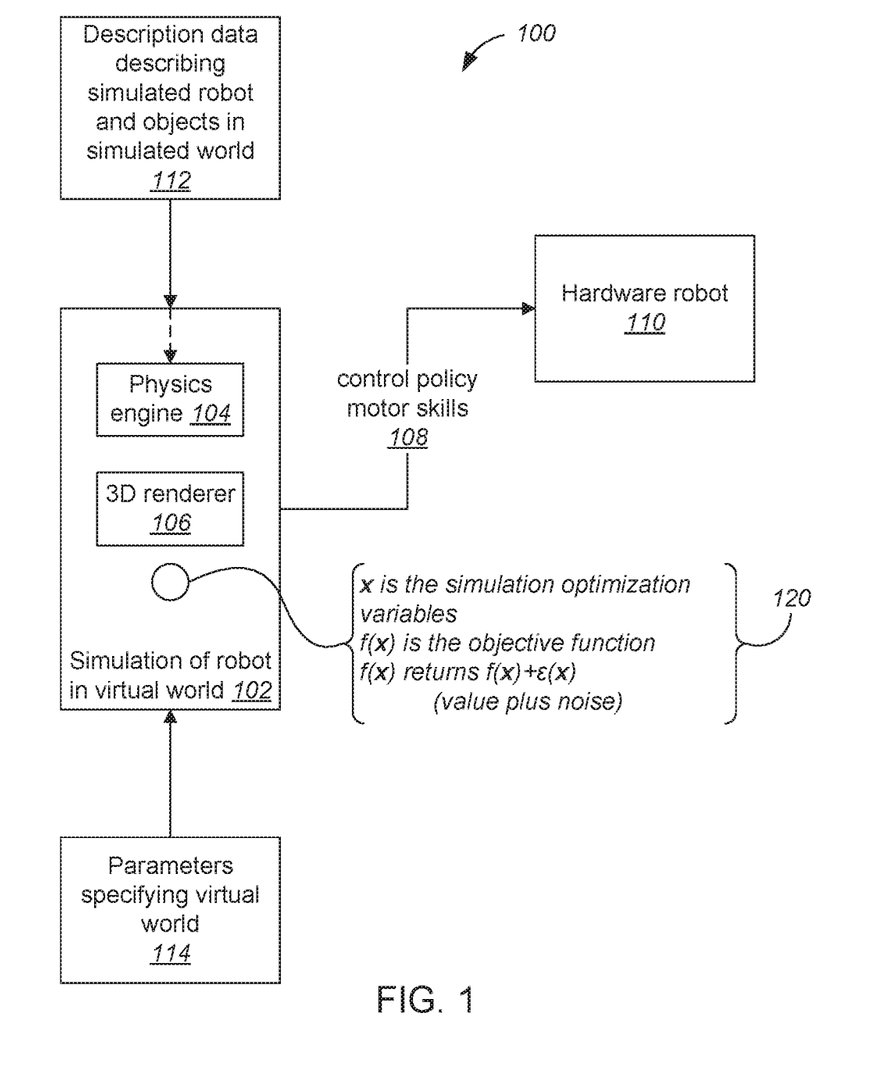
FIG. 1 is a block diagram illustrating elements of a simulation system for simulation of a robot.

FIG. 1 is a block diagram illustrating elements of a simulation system 100 for simulation of a robot.

A simulation system 102 for simulation of a robot includes a physics engine 104 and a 3D renderer 106. A simulation of a robot learns a control policy and, generally, motor skills 108, which can be transferred to a real-world, hardware robot 110. The simulation system receives, for any simulation, description data 112 describing simulated robot and objects in the simulated world and parameters 114 specifying a virtual world.

A simulation is specified (120) by simulation optimization variables $x \in \mathbb{R}^n$, possibly constrained to live in a subset $\Omega$, specifying, e.g., bound constraints. The objective function, $f$, is a scalar-valued function of the internal states x encountered during the simulation. Every time $f$ is evaluated at x, the evaluation returns $f(x)+\epsilon(x)$ where $\epsilon(x)$ is a noise term.

Figure 2:
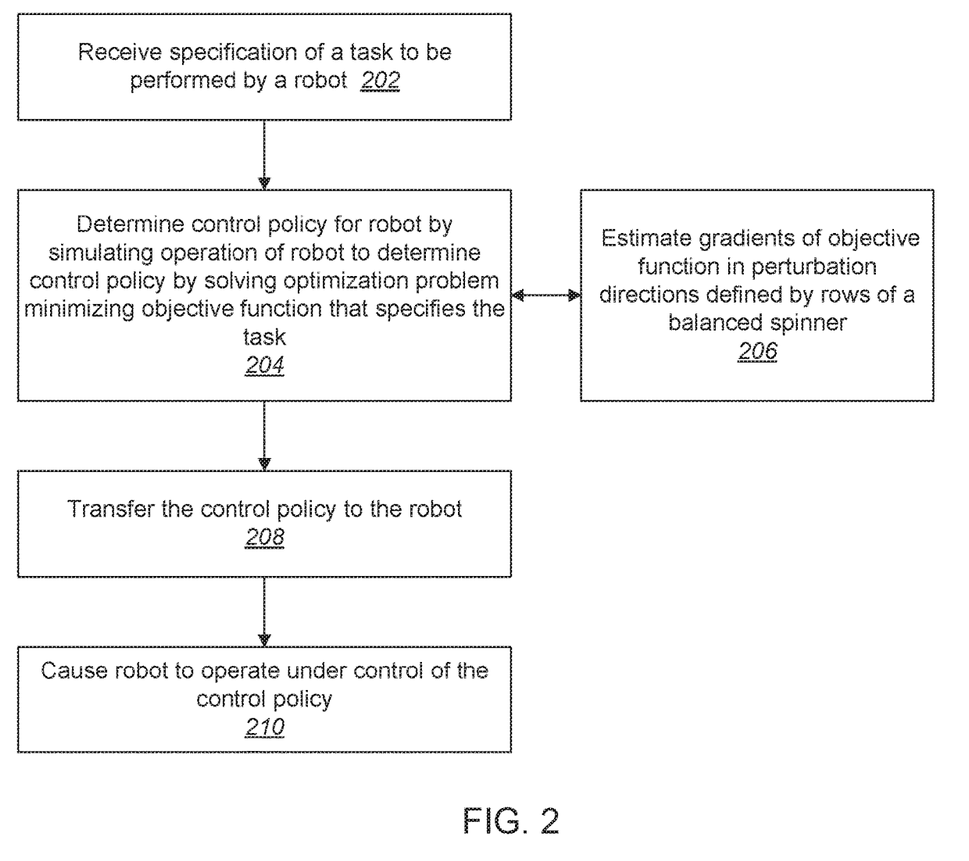
FIG. 2 is a flowchart illustrating an example method for determining a control policy for a robot.

FIG. 2 is a flowchart illustrating an example method for determining a control policy for a robot using a simulation system of the kind illustrated in FIG. 1. The method receives a specification in the form of an objective function $f$ of a task to be performed by a robot (202). The objective function $f$ is a scalar-valued objective function of a control policy, and the control policy determines, for each state s of the robot, an action u to be performed by the robot. The objective function $f$ represents how well the robot performs the task. The method determines (204) the control policy for the robot to perform the task by simulating operation of the robot to determine the control policy x* by solving an optimization problem of the form $$x^* = \underset{x \in \mathbb{R}^n}{\operatorname{argmin}} f(x).$$

The term $x \in \mathbb{R}^n$ is a state of the control policy encountered during the simulating of the operation of the robot. Solving the optimization problem includes estimating gradients of the objective function $f$ using a finite difference procedure to estimate the gradients in perturbation directions defined by rows of a balanced spinner (206). Balanced spinners are structured matrices that define a rotation or a linear transformation that is close to a rotation of a coordinate system of x. When the control policy has been determined by the simulation, it is transferred to the robot (208).

Balanced spinners can be characterized as $(\alpha,\beta)$-balanced spinners. An $(\alpha,\beta)$-balanced spinner for $0 < \alpha \leq 1$ and $0 < \beta \leq 1$ is a matrix $M = \{M_{i,j}\}_{i,j=1\ldots n} \in \mathbb{R}^n$ that is invertible and for which the following are true:

(1) $\|m_i\|_2 \geq \alpha\sqrt{n}$ and $\sup_{i,j \in \{1,\ldots,n\}} |M_{i,j}| \leq 1$; and
(2) $|m_i^\tau m_j| \leq (1-\beta)\min_{i=1,\ldots,n} \|m_i\|_2$ for $1 \leq i < j \leq n$, where $m_i^\tau$ stands for the i-th row of M.

For defining gradients, better balanced spinners are characterized by $\beta \approx 1$, which have rows that are nearly orthogonal. An advantageous balanced spinner is an $(\alpha,\beta)$-balanced spinner wherein $\alpha$ and $\beta$ each differ from 1 by a respective amount that is not more than about $k/\sqrt{n}$, wherein $k \approx 1$ is a constant and n is the dimensionality of x, in which case the rows of the structured matrix are nearly orthogonal and the structured matrix defines a linear transformation that is close to a rotation of the coordinate system of x. Another advantageous example is an $(\alpha,\beta)$-balanced spinner where $\alpha=1$ and $\beta=1$ and the structured matrix defines a rotation of the coordinate system of x.

Particular families of (1,1)-balanced spinners that can be used in the method include Hadamard matrices and quadratic residue matrices. Other forms of (1,1)-balanced spinners that can be used are of the form MD, wherein M is a (1,1)-balanced spinner and D is a diagonal matrix $D \in \mathbb{R}^n$ with diagonal entries that are either $-1$ or $+1$. Other forms also include a Hadamard matrix right multiplied by a diagonal matrix D with diagonal entries that are either $-1$ or $+1$. In some implementations, in either diagonal matrix X the diagonal entries of the diagonal matrix are taken independently at random from the set $\{-1, +1\}$.

Hadamard matrices are matrices that have the form $M = B_1 \otimes \ldots \otimes B_l$,
where $B_1 = \ldots = B_l \in \{-1,+1\}^{2 \times 2}$, $B_1[i][j]$ if $i \neq 1$ or $j \neq 1$, $B_1[1][1] = -1$, and $\otimes$ stands for the Kronecker product.

A quadratic residue matrix is obtained by the following construction, in which p is a prime number of the form $p = 4t+3$, where t is a natural number. A tournament T is defined to as a complete directed graph without multi-edges. A quadratic residue tournament $T_p$ is a tournament on p vertices $\{0, 1, \ldots, p-1\}$, where an edge exists from i to j for $0 \leq i,j \leq p-1$, if and only if i–j is a quadratic residue modulo p. Then, an adjacency matrix $Q_p \in \{-1,1\}^{p \times p}$ of the quadratic residue tournament $T_p$ is a matrix such that for $i \neq j$, $Q_p[i][j] = 1$ if there is an edge from i to j in $T_p$ and $-1$ otherwise, and $Q_p[i][i] = 1$. $Q^*_p \in \mathbb{R}^{(p+1) \times (p+1)}$ denotes a matrix defined as $Q^*_p[i][j] = -1$ if $i=0$ or $j=0$ and $Q^*_p[i][j] = Q_p^\tau[i-1][j-1]$ otherwise. The matrix $(Q^*_p)^\tau$ is a quadratic residue matrix.

The control policy 108 for the robot is, in some implementations, a parameterized control policy and the x is a vectorized version of the parameters of the control policy.

In some implementations, the control policy for the robot is represented by weights and biases of a neural network model, and determining the control policy includes training the neural network to minimize the objective function $f$ to learn the control policy.

In some implementations, determining the control policy for the robot includes performing reinforcement learning policy optimization; and wherein $f$ is a negative of an expected return over the simulation.

Advantageously, in some implementations, estimating gradients of the objective function $f$ (206) includes estimating the gradients of the object function $f$ by fast matrix-vector multiplication of the structured matrix using an Fast Walsh-Hadamard Transform or a Fast Fourier Transform.

After the control policy is transferred to the robot, one can cause the robot to operate under control of the control policy (210).

Figure 3:
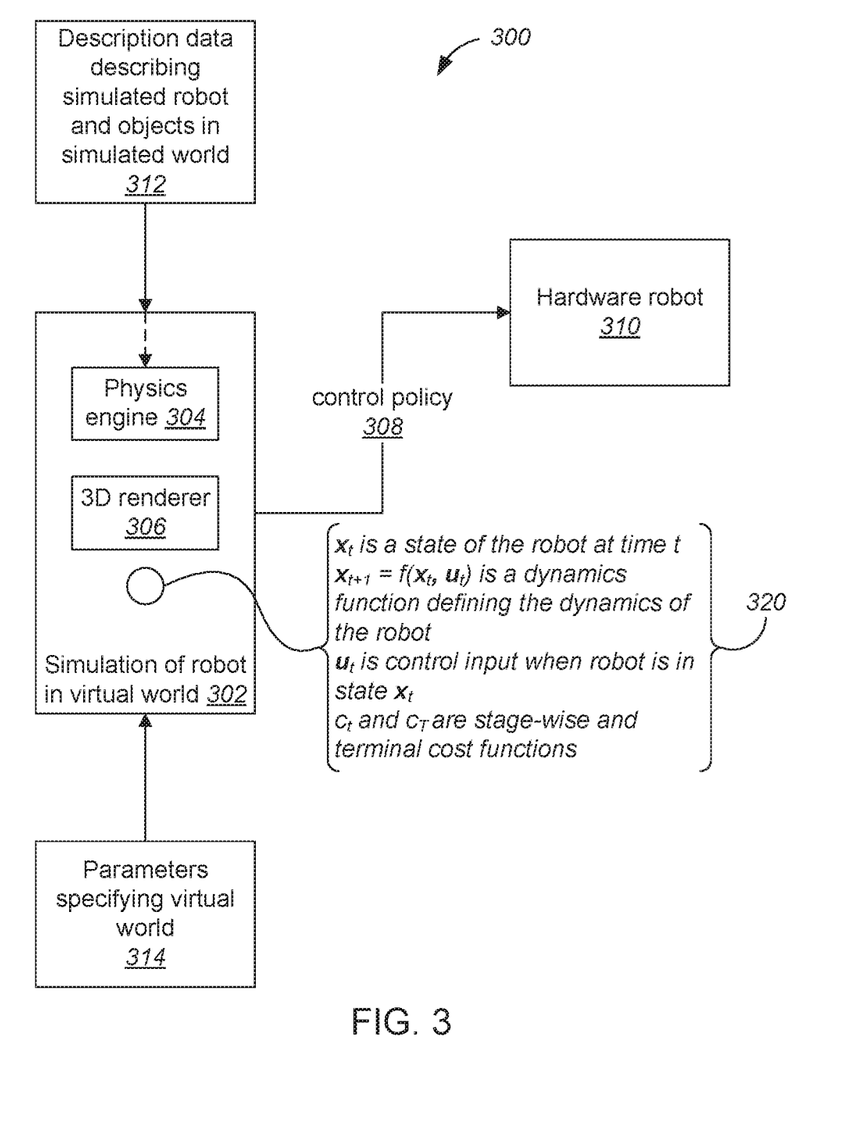
FIG. 3 is a block diagram illustrating elements of another simulation system for simulation of a robot.

FIG. 3 is a block diagram illustrating elements of a simulation system 300 for simulation of a robot.

A simulation system 302 for simulation of a robot includes a physics engine 304 and a 3D renderer 306. A simulation of a robot learns a control policy 308, which can be transferred to a real-world, hardware robot 310. The simulation system receives, for any simulation, description data 312 describing simulated robot and objects in the simulated world and parameters 314 specifying a virtual world.

A simulation is specified (320) by a dynamics function $f$ that defines the dynamics of the robot, which determines $x_{t+1} = f(x_t, u_t)$ as a next state $x_{t+1}$ at time $t+1$ after the robot receives control input $u_t$ when the robot is in state $x_t$. And by a stage-wise cost function $c_t$ and a terminal cost function $c_T$.

Figure 4:
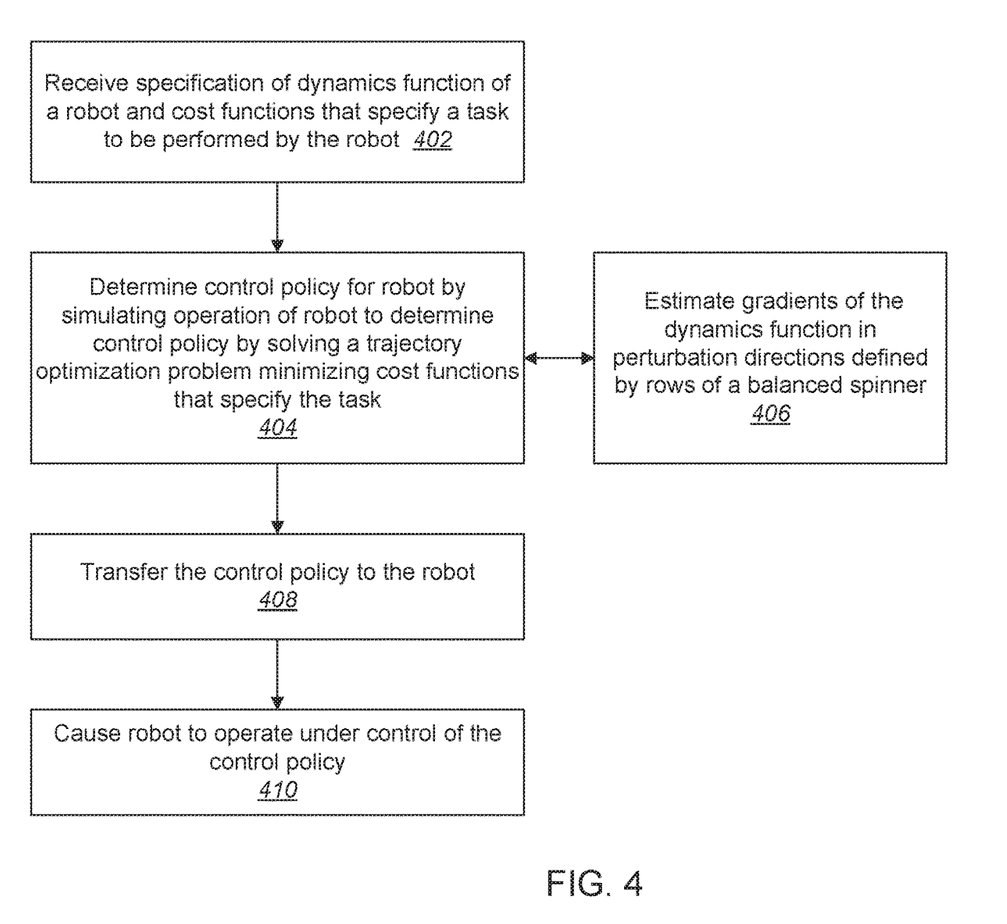
FIG. 4 is a flowchart illustrating another example method for determining a control policy for a robot.

FIG. 4 is a flowchart illustrating an example method for determining a control policy for a robot using a simulation system of the kind illustrated in FIG. 3. The method receives a specification of a dynamics function of the robot and cost functions that specify a task to be performed by the robot (402). Determining the control policy includes simulating operation of the robot to determine the control policy (404), including solving a trajectory optimization problem having a cost function of the following form that represents the task:

$$\underset{u_0 \cdots u_{T-1}}{\mathrm{argmin}} \sum_{t=0}^{T-1} c_t(x_t, u_t) + c_T(x_T).$$

Here, time T is an optimization horizon, $c_t$ and $c_T$ are stage-wise and terminal cost functions, respectively, and the control policy is or includes the sequence of actions $u_0 \ldots u_{T-1}$. Solving the trajectory optimization problem includes linearizing the dynamics function $f$ locally using a finite difference procedure to estimate Jacobians of $f$ at times t. The gradients are estimated in perturbation directions defined by rows of a balanced spinner (406). Balanced spinners are structured matrices that define a define a rotation or a linear transformation that is close to a rotation of a coordinate system of $f$ at times t.

When the control policy has been determined by the simulation, it is transfer to the robot (408).

The robot can then be caused to operate under control of the control policy (410).

In some implementations, the control policy 308 for the robot is represented by weights and biases of a neural network model, and determining the control policy includes training the neural network to minimize the cost function of learning the control policy.

In some implementations, evaluations of $f$ at a state x and an action u return $f(x,u)+\epsilon(x)$, where $\epsilon(x)$ is a noise term.

Advantageously, in some implementations, estimating gradients of the objective function $f$ (406) includes estimating the gradients of the object function $f$ by fast matrix-vector multiplication of the structured matrix using an Fast Walsh-Hadamard Transform or a Fast Fourier Transform.

Each of the systems and methods described above can be used to develop control policies for a variety of real-world robots, including an autonomous vehicle operating on legs or wheels or a flying autonomous vehicle. For robots with legs and that perform walking and turning actions, the control policy can define a walking and turning action. In particular, for robots that can perform autonomous quadruped locomotion, the control policy can define quadruped locomotion. Likewise, for a robot that is a vehicle operating on wheels, the control policy can define a maneuver performed by the vehicle, which can be, for example, a parking maneuver. In other scenarios, the robot is a robot arm with multiple degrees of freedom, e.g., five or more degrees of freedom, and the control policy defines a motion for the robot arm. In some cases, the robot arm has an end effector and the control policy defines a motion to a target goal position.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, the term "engine" refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for determining a control policy for a robot, the method comprising:
   receiving a specification in the form of an objective function $f$ of a task to be performed by the robot,
      wherein $f$ is a scalar-valued objective function of a control policy, and the control policy determines, for each state s of the robot, an action u to be performed by the robot, and
      wherein the objective function $f$ represents how well the robot performs the task;
   determining the control policy for the robot to perform the task by simulating operation of the robot to determine the control policy x* by solving an optimization problem of the form $$x^* = \operatorname*{argmin}_{x \in \mathbb{R}^n} f(x),$$

wherein $x \in \mathbb{R}^n$ is a state of the control policy encountered during simulating the operation of the robot, and wherein solving the optimization problem comprises estimating gradients of the objective function $f$ using a finite difference procedure to estimate the gradients in perturbation directions defined by rows of a balanced spinner, the balanced spinner being a two-dimensional matrix such that the absolute value of an inner product between any one of multiple rows of the two-dimensional matrix and any one of multiple columns of the two-dimensional matrix is bounded by a threshold value, and causing the robot to operate under control of the determined control policy x*.

2. The method of claim 1, wherein the control policy for the robot is a parameterized control policy and the x is a vectorized version of the parameters of the control policy.

3. The method of claim 1, wherein the control policy for the robot is represented by weights and biases of a neural network model, the method further comprising:
training the neural network model to minimize the objective function $f$ to learn the control policy x*; and
transferring the learned control policy x* to the robot.

4. The method of claim 1,
wherein determining the control policy for the robot comprises performing reinforcement learning policy optimization to learn the control policy x*,
wherein $f$ is a negative of an expected return over the simulation, and
wherein the method further comprises:
transferring the learned control policy x* to the robot.

5. The method of claim 1, wherein the optimization problem is of the form $$x^* = \operatorname*{argmin}_{x \in \Omega \mathbb{R}^n} f(x),$$

wherein each x and x* is constrained to be in a subset $\Omega$ of $\mathbb{R}^n$.

6. The method claim 1, wherein, in solving the optimization problem, evaluations of $f$ at a state x return $f(x)+\varepsilon(x)$, where $\varepsilon(x)$ is a noise term.

7. The method of claim 1, wherein the balanced spinners are $(\alpha,\beta)$-balanced spinners, and wherein $0<\alpha\leq 1$ and $0<\beta\leq 1$.

8. The method of claim 7, wherein $\beta\approx 1$ and the rows of the structured matrix are nearly orthogonal.

9. The method of claim 8, wherein $\alpha$ and $\beta$ each differ from 1 by a respective amount that is not more than about $$\frac{k}{\sqrt{n}},$$

wherein $k\approx 1$ is a constant and n is the dimensionality of x, whereby the rows of the structured matrix are substantially.

10. The method of claim 7, wherein $\alpha=1$ and $\beta=1$.

11. The method of claim 10, wherein the structured matrix is of the form $$(Q_p^x)^T,$$

a quadratic residue matrix.

12. The method of claim 10, wherein the structured matrix is a Hadamard matrix.

13. The method of claim 10, wherein the structured matrix is a (1,1)-balanced spinner of the form MD, wherein M is a (1,1)-balanced spinner and D is a diagonal matrix $D \in \mathbb{R}^n$ with diagonal entries that are either $-1$ or $+1$.

14. The method of claim 10, wherein the structured matrix is a Hadamard matrix, a Hadamard matrix right multiplied by a diagonal matrix with diagonal entries that are either $-1$ or $+1$, or a quadratic residue matrix.

15. The method of claim 13, wherein the diagonal entries of the diagonal matrix are taken independently at random from the set $\{-1, +1\}$.

16. The method of claim 15, comprising:
estimating the gradients of the objective function $f$ by fast matrix-vector multiplication of the structured matrix using an FWHT (Fast Walsh-Hadamard Transform) or an FFT (Fast Fourier Transform).

17. A system comprising:
one or more computers and one or more storage devices on which are stored instructions that are operable, when executed by the one or more computers, to cause the one or more computers to perform operations comprising:
receiving a specification in the form of an objective function $f$ of a task to be performed by the robot,
wherein $f$ is a scalar-valued objective function of a control policy, and the control policy determines, for each state s of the robot, an action u to be performed by the robot, and
wherein the objective function $f$ represents how well the robot performs the task;
determining the control policy for the robot to perform the task by simulating operation of the robot to determine the control policy x* by solving an optimization problem of the form $$x^* = \operatorname*{argmin}_{x \in \mathbb{R}^n} f(x),$$

wherein $x \in \mathbb{R}^n$ is a state of the control policy encountered during simulating the operation of the robot, and wherein solving the optimization problem comprises estimating gradients of the objective function $f$ using a finite difference procedure to estimate the gradients in perturbation directions defined by rows of a balanced spinner, the balanced spinner being a two-dimensional matrix such that the absolute value of an inner product between any one of multiple rows of the two-dimensional matrix and any one of multiple columns of the two-dimensional matrix is bounded by a threshold value, and
causing the robot to operate under control of the determined control policy x*.

18. The system of claim 17, wherein the control policy for the robot is a parameterized control policy and the x is a vectorized version of the parameters of the control policy.

19. One or more non-transitory computer-readable storage media encoded with instructions that, when executed by one or more computers, cause the one or more computers to perform operations comprising:
receiving a specification in the form of an objective function $f$ of a task to be performed by the robot,
wherein $f$ is a scalar-valued objective function of a control policy, and the control policy determines, for each state s of the robot, an action u to be performed by the robot, and
wherein the objective function $f$ represents how well the robot performs the task; and
determining the control policy for the robot to perform the task by simulating operation of the robot to determine the control policy x* by solving an optimization problem of the form $$x^* = \operatorname*{argmin}_{x \in \mathbb{R}^n} f(x),$$

wherein $x \in \mathbb{R}^n$ is a state of the control policy encountered during simulating the operation of the robot, and wherein solving the optimization problem comprises estimating gradients of the objective function $f$ using a finite difference procedure to estimate the gradients in perturbation directions defined by rows of a balanced spinner, the balanced spinner being a two-dimensional matrix such that the absolute value of an inner product between any one of multiple rows of the two-dimensional matrix and any one of columns of the two-dimensional matrix is bounded by a threshold value, and causing the robot to operate under control of the determined control policy x*.

20. The computer-readable storage media of claim 19, wherein the control policy for the robot is a parameterized control policy and the x is a vectorized version of the parameters of the control policy.

\* \* \* \* \*